United States Patent [19]

Aoki et al.

[11] Patent Number: 4,971,436
[45] Date of Patent: Nov. 20, 1990

[54] PROJECTOR

[75] Inventors: Shigeo Aoki, Habikino; Yasuhiro Ukai, Kobe, both of Japan

[73] Assignee: Hosiden Electronics Co., Ltd., Osaka, Japan

[21] Appl. No.: 443,533

[22] Filed: Nov. 30, 1989

[30] Foreign Application Priority Data

Dec. 9, 1988 [JP] Japan .................. 63-311422

[51] Int. Cl.⁵ .................................... G03B 21/28
[52] U.S. Cl. ........................... 353/31; 353/37; 353/98; 353/122
[58] Field of Search ............... 353/31, 37, 30, 122, 353/98, 99; 350/630, 629, 628, 331 R, 333, 339 F, 351; 362/296, 297

[56] References Cited

U.S. PATENT DOCUMENTS

| | | | |
|---|---|---|---|
| 3,762,207 | 10/1973 | Weiser | 350/630 |
| 4,127,322 | 11/1978 | Jacobson | 353/37 |
| 4,606,613 | 8/1986 | Urabe | 350/351 |
| 4,653,867 | 3/1987 | Urabe et al. | 350/351 |
| 4,716,403 | 12/1987 | Morozumi | 350/339 F |
| 4,722,593 | 2/1988 | Shimazaki | 350/339 F |
| 4,826,311 | 5/1989 | Ledebuhr | 353/31 |
| 4,838,654 | 6/1989 | Hamaguchi et al. | 350/333 |
| 4,855,724 | 8/1989 | Yang | 350/339 F |

FOREIGN PATENT DOCUMENTS 0151101 8/1984 Japan .................. 350/630

*Primary Examiner*—William A. Cuchlinski, Jr.
*Assistant Examiner*—William C. Dowling
*Attorney, Agent, or Firm*—Pollock, Vande Sande and Priddy

[57] ABSTRACT

In projection device light from a point light source unit is reflected by a first reflecting mirror to produce parallel rays, which are applied to a color active matrix liquid crystal display unit. The parallel rays having passed through the liquid crystal display unit are converted by a second reflecting mirror into a bundle of rays of a desired solid angle for projection onto a screen.

4 Claims, 2 Drawing Sheets

PROJECTOR

BACKGROUND OF THE INVENTION

The present invention relates to projecting an image through use of a liquid crystal display device.

A conventional projector of this kind employs liquid crystal display panels 2a, 2b and 2c as shown in FIG. 1. The liquid crystal display panels are each an ordinary black-and-white active matrix liquid crystal display panel with no color filter, and each picture element serves as a light valve, that is, a switch which permits or inhibits the passage therethrough of light incident thereto.

Light 4 emanating from a light source 3, such as a halogen lamp, is converged by a reflector 5, passes through an infrared interference filter (a filter for intercepting or reflecting infrared rays) 6 and then enters a dichroic mirror 7B, by which blue light 4B contained in the light 4 is reflected to a direction perpendicular to the direction of incidence thereto, thereafter being reflected by a reflecting mirror 8 for incidence to the liquid crystal display panel 2c. Light having passed through the dichroic mirror 7B enters a dichroic mirror 7G, by which green light 4G is reflected to a direction perpendicular to the direction of incidence thereto for incidence to the liquid crystal display panel 2b. Light having passed through the dichroic mirror 7G is red light 4R, which is reflected by reflecting mirrors 9 and 10 one after the other for incidence to the liquid crystal display panel 2a.

On the other hand, there are displayed on the liquid crystal display panels 2a, 2b and 2c black-and-white images (or monochromatic images) corresponding to R (red), G (green) and B (blue) signals which are video signals. The red light 4R, the green light 4G and the blue light 4B pass through these liquid crystal display panels 2a, 2b and 2c, respectively, and enter a dichroic prism 11. These incident rays of light bear the images displayed on the liquid crystal display panels 2a, 2b and 2c and are combined by the dichroic prism 11 into one color image, which is projected by a projection lens 12 onto a screen 13 to create thereon an enlarged color image.

The conventional projector is of the type in which images displayed on respective liquid crystal display panels are combined and projected by the projection lens 12 onto a screen to create thereon an enlarged image. To solve problems of spherical and chromatic aberrations of the lens, the prior art device calls for a combination of many complicated lenses—this inevitably increases a loss of the quantity of light by them.

Further, it is difficult to enlarge the aperture of the projection lens 12, and the relatively small liquid crystal display panels 2a, 2b and 2c must be used in accordance with the diameter of the projection lens 12. For projecting an image on a wide screen it is necessary to increase the distance between the screen and the projector; in the former, a large space is needed, and in the latter, to enlarge the diameter of the lens 12 becomes more difficult.

Moreover, the prior art device requires three liquid crystal display panels and involves splitting light by the two dichroic mirrors 7B and 7G and then combining them by the dichroic prism 11. Hence, adjustment of the positions of the three liquid crystal display panels 2a, 2b and 2c is cumbersome and the device is complicated in structure and expensive.

SUMMARY OF THE INVENTION

It is therefore an object of the present invention to provide a simple-structured, easy-to-use projector which efficiently utilizes light from the light source and permits the production of a relatively large projected image, even if the distance to the screen is short.

The projector of the present invention includes a point light source unit, a reflecting collimator means, a reflecting projection means, and a color active matrix liquid crystal display unit.

The reflecting collimator means reflects, by its reflecting concave face, incident light from the point light source unit to produce parallel rays for incidence to the color active liquid crystal display unit.

The color active liquid crystal display unit permits or inhibits the passage through each picture element of the incident light from the reflecting collimator means in accordance with an image being displayed on the display unit.

The reflecting projection means is a means by which the parallel rays incident thereto after passing through the color active liquid crystal display unit are reflected as a bundle of rays of a desired solid angle, projecting onto the screen the image being displayed on the color active liquid crystal display unit.

It is desirable that the color active liquid crystal display unit use an optical interference filter as a color filter.

DESCRIPTION OF THE PREFERRED EMBODIMENTS

Figure 1:
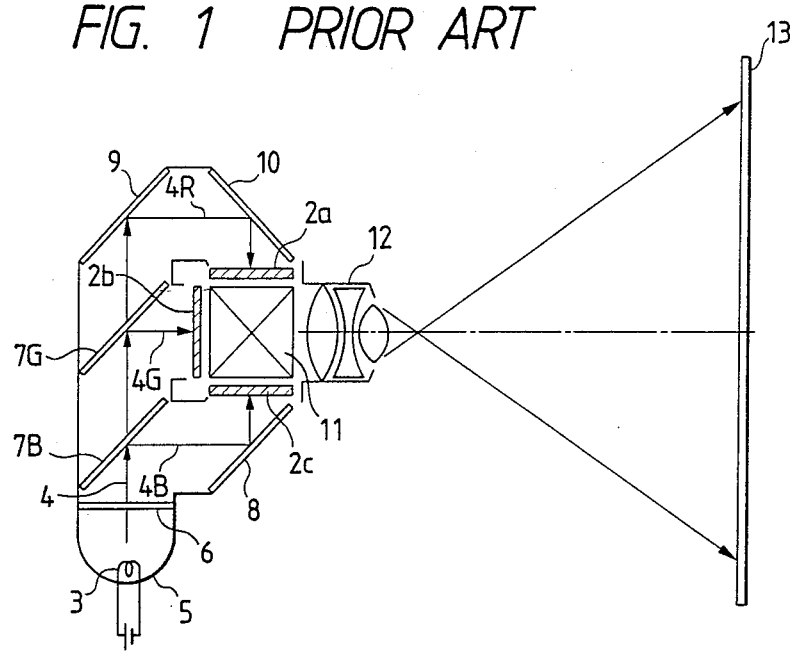
FIG. 1 is a schematic diagram showing the basic construction of a conventional projector.
Figure 2:
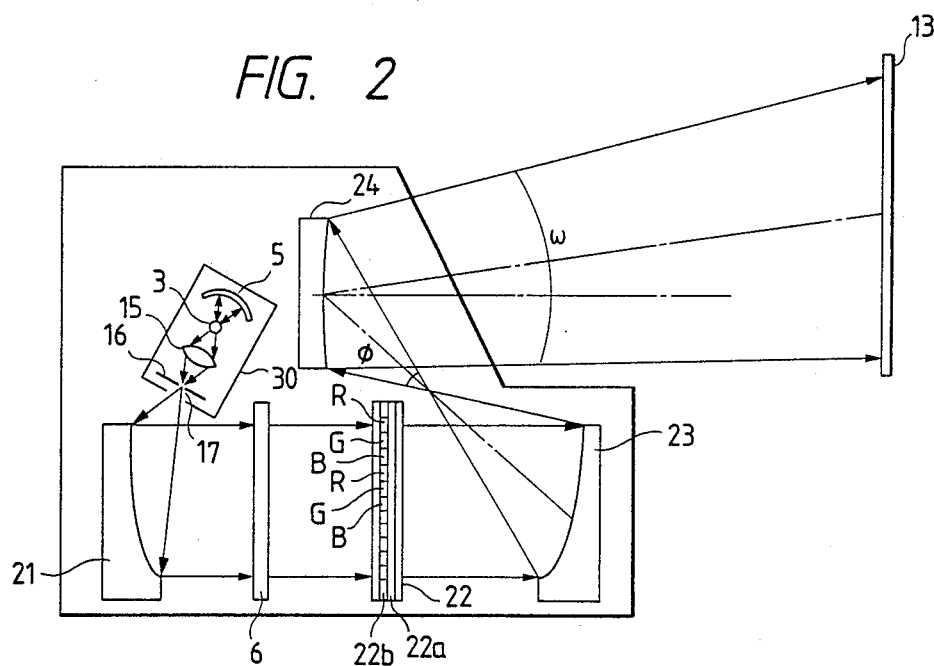
FIG. 2 is a schematic diagram illustrating the basic constitution of an embodiment of the present invention.

The present invention employs a plurality of relatively large reflecting mirrors, instead of using the conventional projection lens which is difficult of enlargement of its diameter and necessitates the combined use of many lenses having special curved faces for reducing spherical and chromatic aberrations. Further, the present invention utilizes a system which applies light from a point light source unit to one color active liquid crystal display unit, in place of the system which splits light from the light source into red, green and blue lights, applies them to individual liquid crystal display panels and then combines lights having passed therethrough as in the prior art. A detailed description will be given, with reference to FIG. 2, of an embodiment of the present invention. In FIG. 2 the parts corresponding to those in FIG. 1 are identified by the same reference numerals.

The point light source unit 30 has an arrangement in which light from the light source 3, such as a halogen or xenon lamp, is converged by the reflecting mirror 5 and a condenser lens 15 to a pin hole 17 made in a light shielding plate 16, and light emitted from the pin hole 17 is applied as light from the point light source unit to a first reflecting mirror 21. The first reflecting mirror 21 is a concave mirror which reflects the incident light as parallel rays and constitutes a collimator. The reflected light from the first reflecting mirror 21 passes through the infrared interference filter 6 and enters a color active matrix liquid crystal display unit (hereinafter referred to as a color ALCD) 22. The color ALCD 22 is commercially available and has an image forming section 22a in which liquid crystal display elements are arranged in a matrix form and red, green and blue color filters 22b disposed opposite the display elements corresponding thereto, respectively. The color ALCD 22 is driven by a driver (not shown) to display thereon a color image. Light passed through the color ALCD 22 bears the color image and enters a second reflecting mirror 23, by which it is reflected to a third reflecting mirror 24, by which it is reflected again to be projected onto the screen 13, thus creating thereon the color image. The third reflecting mirror 24 may be a concave, plane or convex mirror and is used to convert the bundle of incident rays of a solid angle $\phi$ from the second reflecting mirror 23 to a bundle of rays of a desired solid angle $\omega$.

The first and second reflecting mirrors 21 and 23 can easily be formed far larger than the conventional projection lens 12. Consequently, a large ALCD 22 can be used corresponding to the sizes of the reflecting mirrors 21 and 23 and the enlargement ratio of the image to be projected onto the screen 13 can be reduced accordingly. That is, the bundle of rays reflected by the third reflecting mirror 24 for projection onto the screen 13 is enlarged with the solid angle $\omega$, and this enlargement ratio is relatively smaller than in the conventional projection lens 12; consequently, lowering of the brightness of the projected image by the projection distance is reduced accordingly.

As the curved face of each of the reflecting mirrors 21, 23 and 24 an adjustable curved face is used which can be obtained by correction based on a parabolic curved face or ellipse through computer simulation so as to produce a distortion-free image of uniform brightness. Since the diameter of the bundle of rays decreases as the third reflecting mirror 24 is brought closer to the position of focus of the second reflecting mirror 23, the aperture of the third reflecting mirror 24 can be reduced accordingly. However, since the third reflecting mirror 24 also can easily be formed large in aperture as is the case with the first and second reflecting mirrors 21 and 23, the position of the third reflecting mirror 24 relative to the second reflecting mirror 23 can be selected relatively freely.

In the embodiment shown in FIG. 2 the third reflecting mirror 24 is provided primarily to divert the direction of projection of the bundle of rays from the second reflecting mirror 23, and hence it may also be a mere plane reflecting mirror. It is also possible, of course, to employ, as required, a reflecting mirror having a desired curved face (a concave or convex face) for converting the rays of incident rays of the solid angle $\phi$ from the second reflecting mirror 23 to a bundle of rays of the desired solid angle $\omega$ as described previously. Alternatively, it is possible to use a plane mirror as the second reflecting mirror 23, through which parallel rays which have passed through the color ALCD 22 are applied intact to the third reflecting mirror 24, by which they are converted to a bundle of rays of the desired solid angle $\omega$ for projection onto the screen 13. At any rate, the second and third reflecting mirrors 23 and 24 form, in combination, a reflecting type projection means by which the parallel rays having passed through the color ALCD 22 are projected as a bundle of rays of a desired solid angle onto the screen 13.

Figure 3:
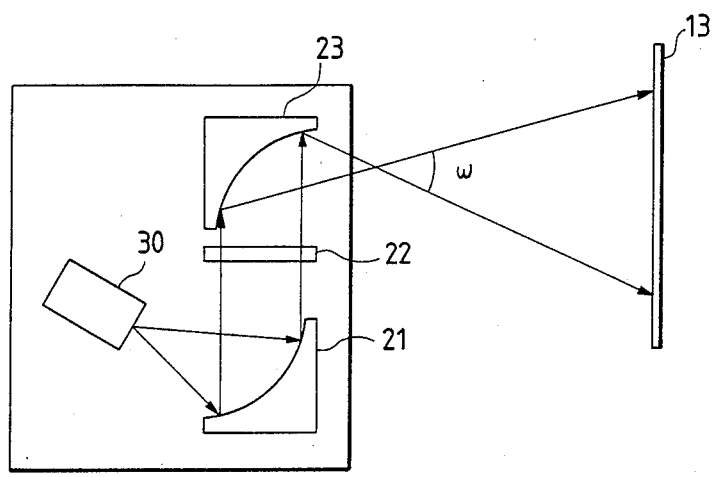
FIG. 3 is a schematic diagram illustrating another embodiment of the present invention.

FIG. 3 illustrates another embodiment of the projector of the present invention, in which the parts corresponding to those in FIG. 2 are identified by the same reference numerals. In this embodiment the bundle of rays from the point light source unit 30 is converted by the first reflecting mirror 21 into parallel rays, which are applied to the color ALCD 22. The parallel rays having passed through the color ALCD 22 are converted by the second reflecting mirror 23 into a bundle of rays of the desired solid angle $\omega$, which is projected onto the screen 13. Accordingly, in this embodiment the second reflecting mirror 23 constitutes the reflecting projection means which corresponds to the combination of the second and third reflecting mirrors 23 and 24 in the embodiment depicted in FIG. 2.

Figure 4:
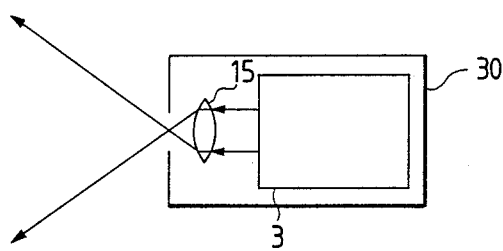
FIG. 4 is a schematic diagram showing a modified form of a point light source unit 30 for use in the present invention.

In the embodiments depicted in FIGS. 2 and 3 the point light source unit 30 may also be arranged so that parallel rays containing desired red, green and blue color components, emitted from the light source 3 formed by a laser, are converted by a lens 15 to a bundle of rays of a desired solid angle for emission as shown in FIG. 4. With such an arrangement, a substantially ideal point light source can be implemented, and consequently, an appreciably sharp image can be projected onto the screen 13. In this instance, the infrared interference filter 6 need not be used.

It is desirable, in the embodiments of FIGS. 2 and 3, to employ an optical interference filter as the color filter section 22b of the color ALCD 22. The optical interference filter is formed as a multilayer film by alternate vapor deposition of materials such as $SiO_2$ and $TiO_2$ of different refractive indexes onto a glass substrate as described in detail in, for example, S. Aoki et al, "An Active Matrix Color LCD with High Transmittance Using an Optical Interference Filter," Proceedings of the 9th International Display Research Conference, October 1989. By changing each film thickness and the overall film thickness, light selection characteristics based on interference of light vary, by which it is possible to form color filters which transmit therethrough red, green and blue color components, respectively. Since this optical interference filter utilizes interference of light, a high transmittance of between 90 and 100% can be obtained, whereas the transmittance of a conventional dyed filter (containing an organic dye of a desired wavelength-transmission characteristic in a resin film) is in the range of 60 to 80% at the peak wavelength.

Moreover, since the optical interference filter uses inorganic materials such as $SiO_2$ and $TiO_2$ unlike the dyed filter, its heat-resisting temperature is as high as around 500° C. Accordingly, even if used under high temperature conditions for many hours, the optical interference filter is hardly discolored by temperature, and hence exhibits excellent heat resistance. In contrast thereto, since the conventional dyed filter employs the organic resin, its heat-resisting temperature is relatively low, about 180° C., posing a problem in its heat resistance in that the conventional filter, when used for many hours at high temperatures, is appreciably discolored, resulting in the reduction of its service life. Besides, the optical interference filter using the $SiO_2$, $TiO_2$, etc., even if exposed to irradiation by light for a long period of time, is almost free from discoloration by the influence of light absorption, and hence exhibits excellent in resistance to light. In contrast thereto, if the conventional dyed filter is irradiated by light for a long period of time, its light selecting characteristic changes with time under the influence of light absorption, resulting in discoloration of the filter.

Since the optical filter is high in transmittance and has excellent in heat resistance and light resistance as described above, it is suitable for use as the color ALCD of a projector, but its wavelength characteristic changes with a change in the angle of incidence of light to the filter. In the embodiments of FIGS. 2 and 3, however, since parallel rays are applied from the first reflecting mirror 21 to the color ALCD 22, the angle of incidence of light thereto is uniform over the entire area of its surface, causing no color variations in the image displayed.

As described above, according to the present invention, since the optical system is formed by reflecting mirrors alone and no conventional projection lens is used, substantially no loss is caused in the light to be projected, and consequently, loss of light in the image-forming optical system decreases accordingly. The reflecting faces of the reflecting mirrors 21 and 23, which constitute the optical system, can be made large relatively easily and a large color ALCD can be used correspondingly. This permits the projection of a relatively large image onto the screen 13 without the necessity of selecting so large the solid angle ω of the bundle of rays to be applied to the screen 13. Conversely speaking, in the case of projecting an image of the same size, the distance to the screen 13 can be made shorter than in the conventional system, and hence the space required can be decreased accordingly.

Unlike the prior art device the present invention does not need a dichroic mirror or dichromic prism which splits or combines light, and employs only one color active matrix liquid crystal display unit in place of the three liquid crystal display panels. Consequently, the device of the present invention is far simpler in structure and more economical than the conventional device.

The conventional projection device of FIG. 1 requires so-called focusing for minimizing defocusing of an image on the screen 13 by adjusting the position of the lens 12. In contrast thereto, the device of the present invention utilizes the principle of projecting onto the screen an image of an object placed in the bundle of rays emitted from the point light source, and hence does not call for such focusing and is much easier to use than is conventional device.

It will be apparent that many modifications and variations may be effected without departing from the scope of the novel concepts of the present invention.

What is claimed is:

1. A projection device comprising:
   a point light source means operative to emit light containing desired wavelength components as light from a light source which can be regarded as substantially a point;
   a reflecting collimator means which receives and reflects said light from said point light source means to produce parallel rays of light;
   a color active matrix liquid crystal display means disposed in the optical path of said parallel rays of light from said reflecting collimator means, said liquid crystal display means being responsive to image signals to display a desired color image; and
   a reflecting projection means which reflects said parallel rays of light which have passed through said color active matrix liquid crystal display means to convert said parallel rays to a bundle of light rays of a desired solid angle and to project said bundle of light rays onto a screen thereby to display said color image on the screen.

2. The projection device of claim 1 wherein said reflecting projection means includes a first reflecting mirror for reflecting, as a bundle of light rays of a desired first solid angle, said parallel rays which have passed through said color active matrix liquid crystal display means, and a second reflecting mirror for reflecting said bundle of rays reflected by said first reflecting mirror as a bundle of rays of a desired second solid angle for projection onto said screen.

3. The projection device of claim 1 or 2 wherein said color active matrix liquid crystal display means includes color filters formed by an optical interference filter which permits the passage therethrough of said desired wavelength components.

4. The projection device of claim 1 or 2 wherein said point light source means includes a laser beam source which emits light containing said desired wavelength components.

* * * * *